United States Patent [19]
Huang

[11] Patent Number: 5,889,464
[45] Date of Patent: Mar. 30, 1999

[54] TIRE PRESSURE INDICATOR INCLUDING PRESSURE GAUGES THAT HAVE A SELF-GENERATING POWER CAPABILITY

[76] Inventor: Tien-Tsai Huang, No. 4, Lane 30, Wu-Chuan St., Pan-Chiao City, Taipei Hsien, Taiwan

[21] Appl. No.: 42,102

[22] Filed: Mar. 13, 1998

[51] Int. Cl.⁶ .................................................. B60C 23/00
[52] U.S. Cl. .......................... 340/442; 340/447; 73/146.5
[58] Field of Search .................................... 340/447, 443, 340/444, 445, 446, 449, 539; 73/146.5, 146.4

[56] References Cited

U.S. PATENT DOCUMENTS

| 5,061,917 | 10/1991 | Higgs et al. | 340/539 |
| 5,289,161 | 2/1994 | Huang | 340/447 |
| 5,463,374 | 10/1995 | Mendez et al. | 340/442 |
| 5,546,070 | 8/1996 | Ellmann et al. | 340/442 |
| 5,694,111 | 12/1997 | Huang | 340/442 |

Primary Examiner—Jeffery A. Hofsass
Assistant Examiner—Daryl C. Pope
Attorney, Agent, or Firm—Ladas & Parry

[57] ABSTRACT

A tire pressure indicator includes a pressure gauge for a pneumatic tire of a vehicle. The pressure gauge has a casing formed with an aperture and mounted on the pneumatic tire such that air in the pneumatic tire flows into the casing via the aperture. A signal generating device is disposed in the casing and is capable of transmitting wirelessly a pressure signal corresponding to pressure of the air in the pneumatic tire. A power supplying device is disposed in the casing and is connected electrically to the signal generating device so as to supply electric power for operating the signal generating device. The power supplying device includes a self-generating voltage unit which has a spring plate with a mounting end secured to the casing and an opposite distal end, a weighting block secured to the distal end, and a piezoelectric unit secured to the spring plate. The spring plate is capable of deforming so as to subject the piezoelectric unit to mechanical stress when the pneumatic tire is in motion so as to enable the piezoelectric unit to generate a voltage output.

27 Claims, 14 Drawing Sheets

TIRE PRESSURE INDICATOR INCLUDING PRESSURE GAUGES THAT HAVE A SELF-GENERATING POWER CAPABILITY

BACKGROUND OF THE INVENTION

1. Field of the Invention

The invention relates to a tire pressure indicator, more particularly to one including pressure gauges that have a self-generating power capability.

2. Description of the Related Art

In U.S. Pat. No. 5,289,161, there is disclosed a known tire pressure indicator that includes a set of pressure gauges, each of which is mounted on a corresponding pneumatic tire of a vehicle, and a receiver device. Each pressure gauge wirelessly transmits a pressure signal to be received by the receiver device when the pressure in the corresponding pneumatic tire is not within a predetermined normal operating pressure range. As such, the receiver device can alert the driver of the vehicle in the event of an abnormal tire pressure condition.

Since the receiver device of the known tire pressure indicator is built into an instrument panel of the vehicle or as a separate device to be installed in the driver room of the vehicle, the power source of the vehicle can be used as the power source for the receiver device. However, since the pressure gauges of the known tire pressure indicator are mounted on the tires of the vehicle, battery cells are used as the power source for the pressure gauges. The need to replace the battery cells when they run out of power inconveniences the owner of the vehicle.

In co-pending U.S. patent application Ser. No. 08/898,435, filed on Jul. 22, 1997, the Applicant disclosed a pressure gauge which includes a casing, a signal generating device, and a power supplying device that is disposed in the casing and that is connected electrically to the signal generating device so as to supply the electric power required for operating the latter. The power supplying device includes a self-generating voltage unit, a rechargeable cell unit and a rectifying-and-charging unit. The self-generating voltage unit has a piezoelectric unit and an impact unit that is capable of continuously striking against the piezoelectric unit when the pneumatic tire to which the casing is mounted is in motion so as to enable the piezoelectric unit to generate a voltage output. The rectifying-and-charging unit interconnects the self-generating voltage unit and the rechargeable cell unit to permit charging of the rechargeable cell unit using the voltage output from the self-generating voltage unit. As such, the possibility that the pressure gauge will run out of power can be eliminated to ensure proper operation of the pressure gauge without causing any inconvenience to the owner of the vehicle.

SUMMARY OF THE INVENTION

The object of the present invention is to provide a tire pressure indicator including a set of pressure gauges, each of which has a self-generating voltage unit that includes a piezoelectric unit on a spring plate to obviate the need for replacing battery cells when the pressure gauges are in use.

According to the present invention, a tire pressure indicator is adapted for use with a set of pneumatic tires of a vehicle, and comprises a plurality of pressure gauges, each of which includes a casing, a signal generating device and a power supplying device.

The casing is formed with an aperture and is adapted to be mounted on a respective one of the pneumatic tires such that air in the respective one of the pneumatic tires flows into the casing via the aperture. The signal generating device is disposed in the casing and is capable of transmitting wirelessly a pressure signal corresponding to pressure of the air in the respective one of the pneumatic tires. The power supplying device is disposed in the casing and is connected electrically to the signal generating device so as to supply electric power for operating the signal generating device. The power supplying device includes a self-generating voltage unit which has a spring plate with a mounting end secured to the casing and an opposite distal end, a weighting block secured to the distal end, and a piezoelectric unit secured to the spring plate. The spring plate is capable of deforming so as to subject the piezoelectric unit to mechanical stress when the pneumatic tire to which the casing is mounted is in motion so as to enable the piezoelectric unit to generate a voltage output.

In one embodiment, the signal generating device comprises a pressure sensing unit and a signal transmitter circuit. The pressure sensing unit includes a sensing coil, a volume variable member, a magnetic core and an encoder unit. The sensing coil is mounted in the casing. The volume variable member is disposed in the casing and has an open end in fluid communication with the aperture, and an opposite closed end. The volume variable member expands in the casing according to the pressure of the air in the pneumatic tire to which the casing is mounted. The magnetic core is formed as a shaft which has a lower portion that is mounted on the closed end of the volume variable member, and an upper portion that extends into the sensing coil such that the depth of extension of the upper portion of the magnetic core into the sensing coil varies according to the expansion of the volume variable member in the casing. The encoder unit is connected to the sensing coil, detects the depth of extension of the upper portion of the magnetic core into the sensing coil, and determines a pressure value in the pneumatic tire to which the casing is mounted therefrom. The signal transmitter circuit is connected to the encoder unit and is controlled by the same to transmit the pressure signal corresponding to the pressure value wirelessly.

In another embodiment, the signal generating device comprises a pressure sensing unit which generates an analog voltage signal that varies in accordance with the pressure of the air that flows into the casing via the aperture, a signal converting unit connected to the pressure sensing unit for converting the analog voltage signal into a digital output signal, an encoder unit connected to the signal converting unit so as to compare the digital output signal of the signal converting unit with high pressure and low pressure limits of a normal operating pressure range, and so as to generate the pressure signal which corresponds to the digital output signal when the digital output signal is not within the normal operating pressure range, and a signal transmitter circuit connected to the encoder unit for transmitting the pressure signal from the encoder unit wirelessly.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
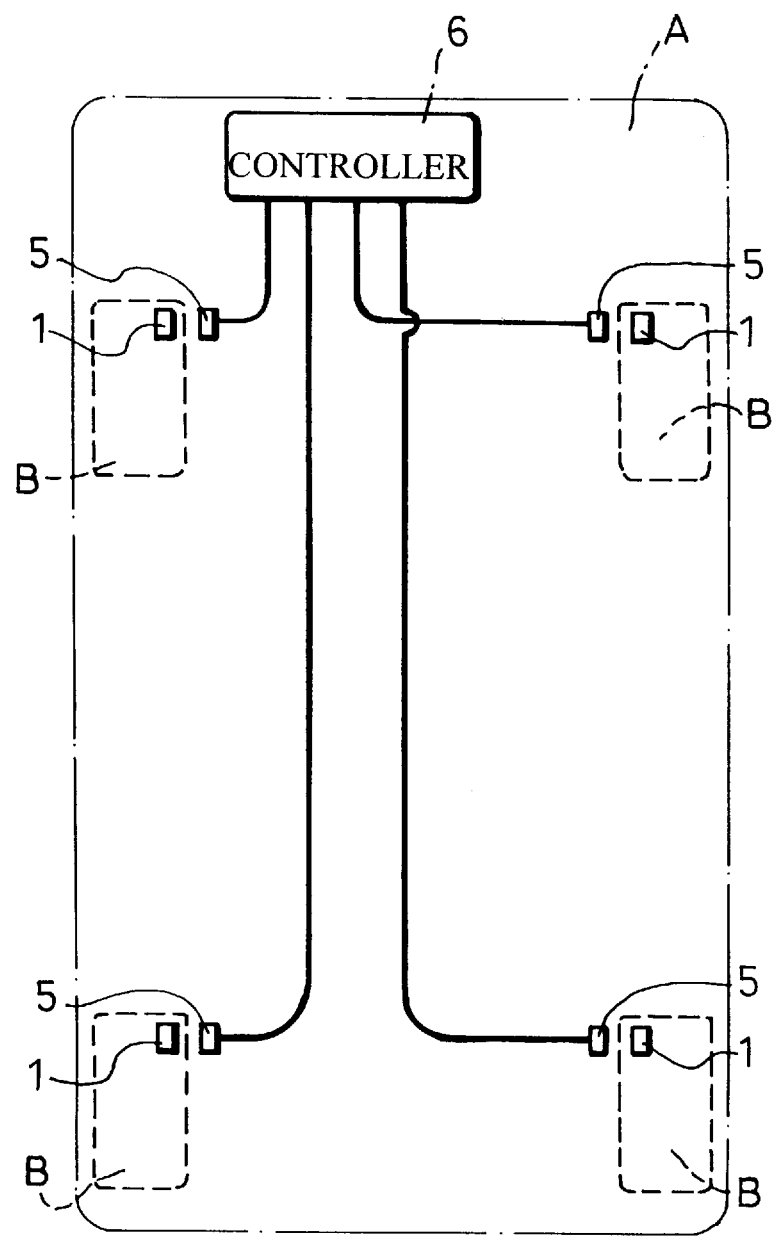
FIG. 1 is a schematic view illustrating the first preferred embodiment of a tire pressure indicator according to the present invention when installed on a vehicle.

Referring to FIG. 1, the first preferred embodiment of a tire pressure indicator according to the present invention is shown to comprise a set of pressure gauges 1, a set of receiver circuits 5 and a controller 6. Each of the pressure gauges 1 is adapted to be mounted on the inflating valve of a respective one of the pneumatic tires (B) on a vehicle (A), and wirelessly transmits a pressure signal corresponding to the pressure in the respective one of the pneumatic tires (B). Each of the receiver circuits 5 is adapted to be mounted on the vehicle (A) adjacent to a respective one of the pneumatic tires (B) so as to receive the pressure signal from the pressure gauge 1 on the adjacent one of the pneumatic tires (B). The controller 6, which is preferably built into an instrument panel (not shown) on the vehicle (A) or as a separate device to be installed in the driver room of the vehicle (A), is connected to the receiver circuits 5. The controller 6 alerts the driver of the vehicle in the event of an abnormal tire pressure condition. An additional pressure gauge 1 and a corresponding receiver circuit 5 maybe provided for a spare pneumatic tire (not shown) in the trunk of the vehicle (A).

Figure 2:
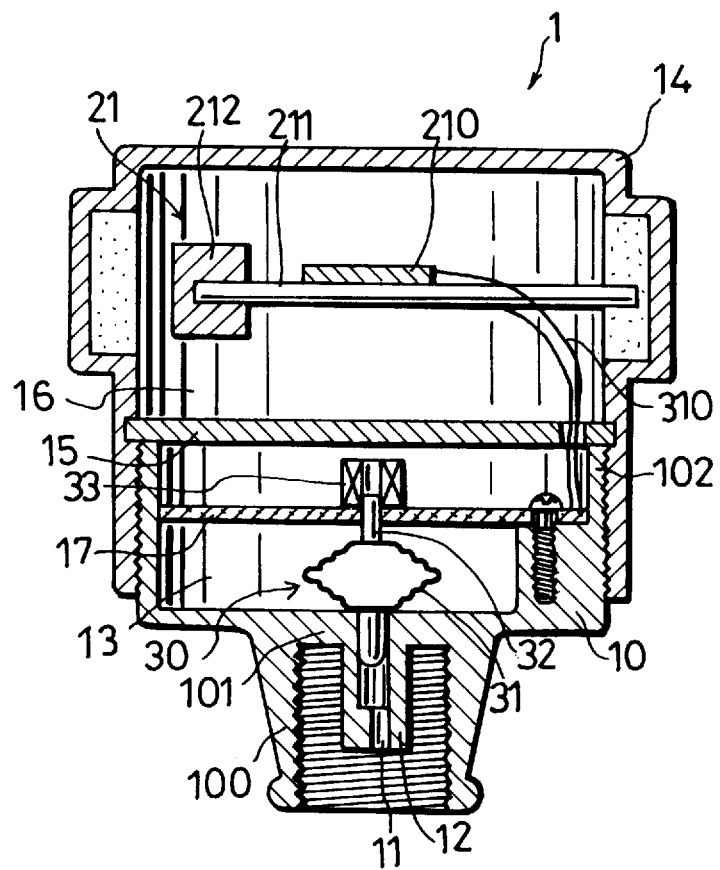
FIG. 2 is a sectional view of a pressure gauge of the first preferred embodiment.
Figure 3:
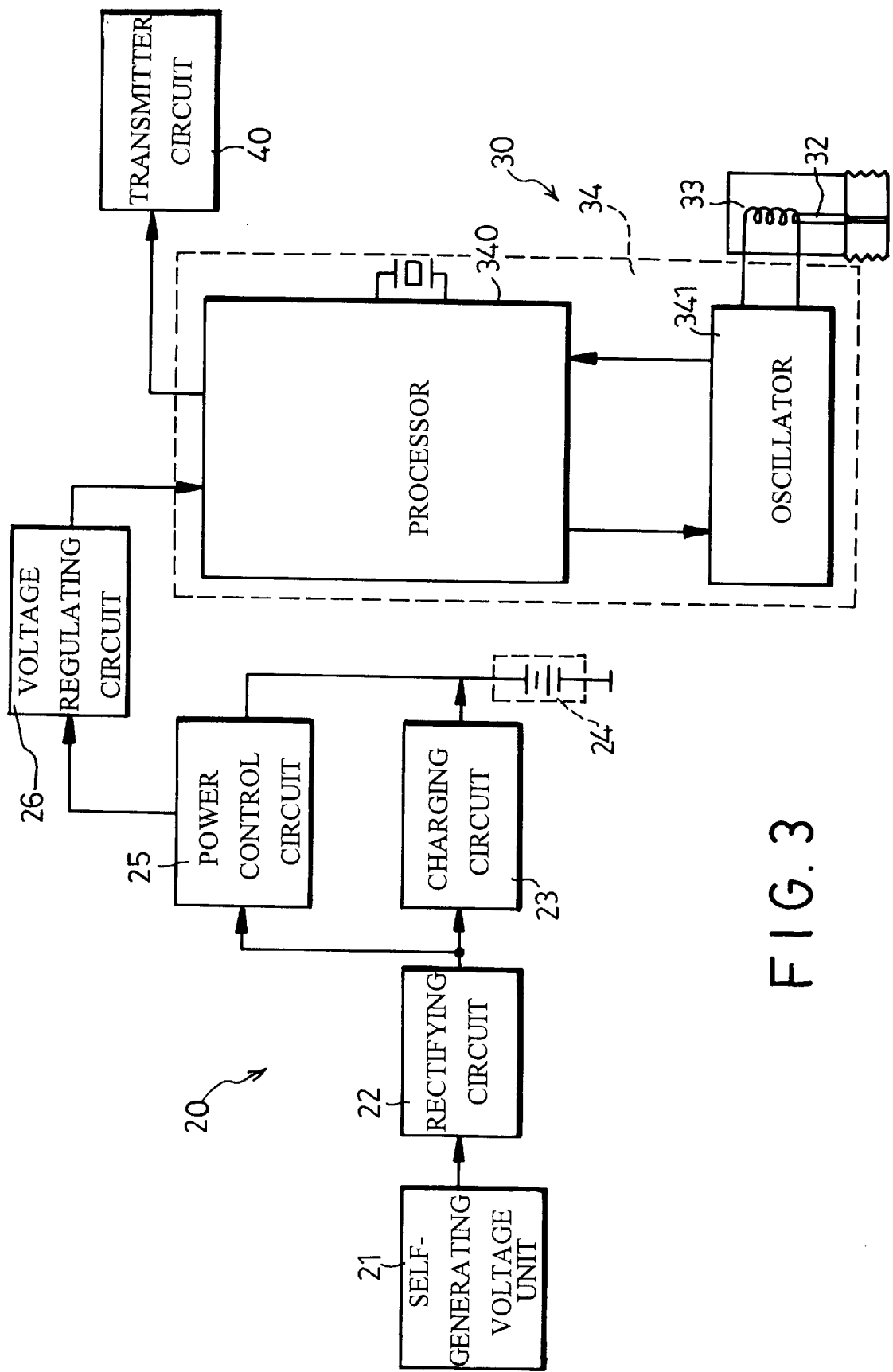
FIG. 3 is a schematic circuit block diagram of the pressure gauge shown in FIG. 2.

Referring to FIGS. 2 and 3, the pressure gauge 1 comprises a casing having a hollow adaptor 10 and a cap 14, and a signal generating device disposed in the casing.

The adaptor 10 has a first open end 100 that is threaded internally for connection with an inflating valve (not shown) of the respective pneumatic tire (B) (see FIG. 1) in a conventional manner. A transverse partition plate 101 extends adjacent to the first open end 100 of the adaptor 10, and is formed with a downwardly extending tubular finger piece 12 to open the inflating valve of the respective pneumatic tire (B) when the adaptor 10 is mounted on the latter. The finger piece 12 is formed with an aperture 11 to permit the flow of air in the pneumatic tire (B) into the same. The cap 14 has a closed end and an internally threaded open end that is coupled threadedly with a second open end 102 of the adaptor 10. A transverse partition plate 15 is mounted in the cap 14, and abuts against the second open end 102 of the adaptor 10, thereby confining a first chamber 13 in the adaptor 10 and a second chamber 16 in the cap 14. A circuit board 17 is mounted in the second open end 102 of the adaptor 10.

The signal generating device includes a pressure sensing unit 30 and a signal transmitter circuit 40. The pressure sensing unit 30 includes a volume variable member 31, a magnetic core 32, a sensing coil 33 and an encoder unit 34.

The sensing coil 33 is mounted on the circuit board 17. The volume variable member 31, such as a bellows tube, is disposed in the first chamber 13 and has an open end that extends into the finger piece 12 so as to be in fluid communication with the aperture 11, and an opposite closed end. The volume variable member 31 expands in the first chamber 13 according to the pressure of air that flows into the finger piece 12 via the aperture 11. The magnetic core 32 is formed as a shaft having a lower portion that is mounted on the closed end of the volume variable member 31, and an upper portion that extends through the circuit board 17 and into the sensing coil 33. The depth of extension of the upper portion of the magnetic core 32 into the sensing coil 33 varies according to the expansion of the volume variable member 31 and the pressure of the air that flows into the aperture 11.

The encoder unit 34 includes a processor 340 connected to the signal transmitter circuit 40, and an oscillator 341 connected to the processor 340 and the sensing coil 33. When the depth of extension of the upper portion of the magnetic core 32 into the sensing coil 33 varies, the oscillating frequency output of the oscillator 341 varies accordingly. The processor 340 detects the oscillating frequency output of the oscillator 341, and converts the same into a corresponding pressure value. The processor 340 then controls the signal transmitter circuit 40 to transmit a pressure signal that corresponds to the pressure value wirelessly.

A power supplying device 20 supplies the electric power required to operate the signal generating device. As shown in FIG. 3, the power supplying device 20 includes a self-generating voltage unit 21, a rectifying circuit 22, a charging circuit 23, a rechargeable cell unit 24, a power control circuit 25 and a voltage regulating circuit 26. The rectifying circuit 22, the charging circuit 23, the rechargeable cell unit 24, the power control circuit 25 and the voltage regulating circuit 26 are mounted on the circuit board 17.

Referring to FIG. 2, the self-generating voltage unit 21 is disposed in the second chamber 16 of the casing, and includes a piezoelectric unit 210, a spring plate 211 and a weighting block 212. The spring plate 211 has a mounting end secured to an inner wall surface of the cap 14, and an opposite distal end with the weighting block 212 secured thereto. The piezoelectric unit 210 is secured to the spring plate 211, and is provided with electrical wires 310 that extend through the partition plate 15 for electrical connection with the rectifying circuit 22 on the circuit board 17. When the pneumatic tire (B) (see FIG. 1) to which the pressure gauge 1 is mounted is in motion, the spring plate 211 deforms, thereby subjecting the piezoelectric unit 210 to mechanical stress so as to enable the piezoelectric unit 210 to generate a voltage output that is supplied to the rectifying circuit 22.

Figure 4:
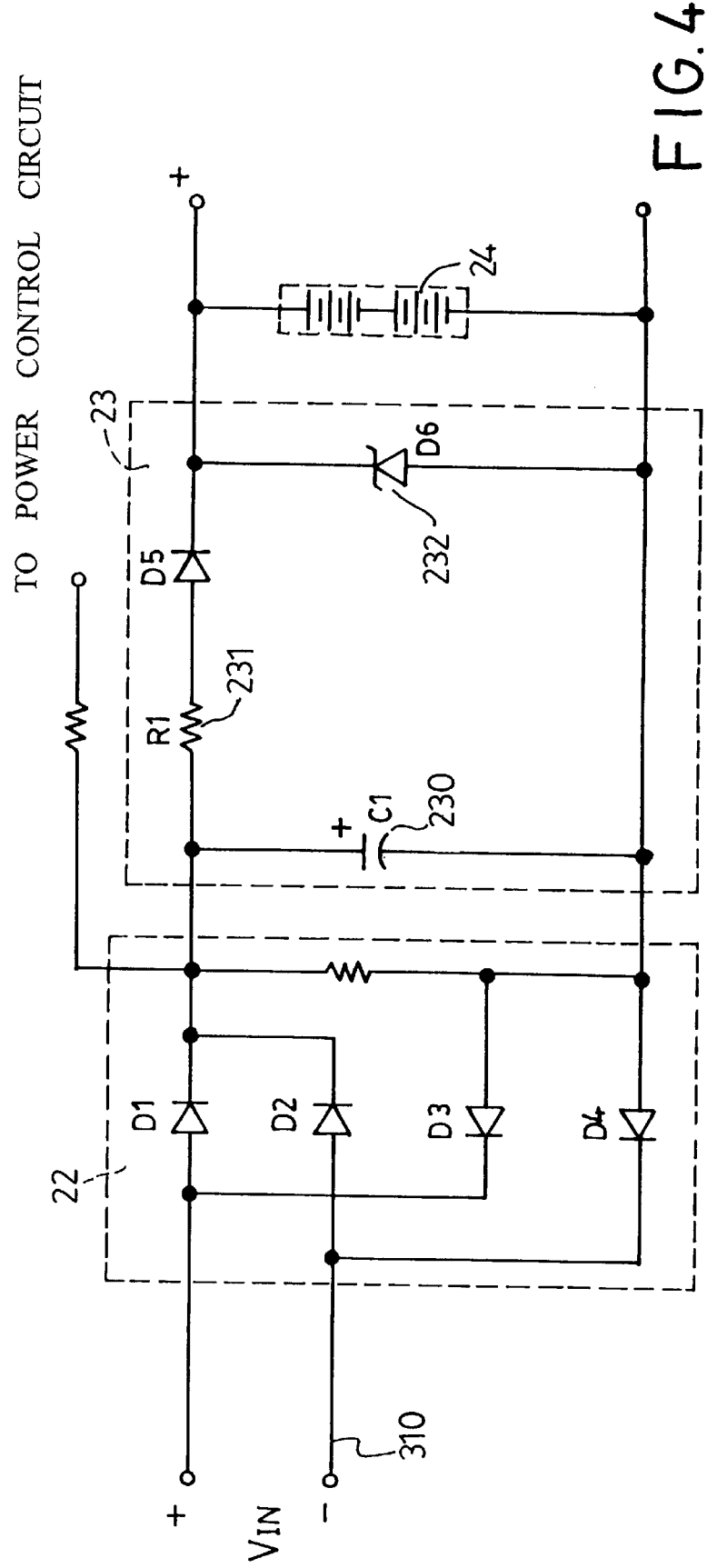
FIG. 4 is a schematic circuit diagram illustrating a rectifying circuit, a charging circuit and a rechargeable cell unit of a power supplying device of the pressure gauge shown in FIG. 2.

Referring to FIG. 4, the rectifying circuit 22 is a full-wave rectifier that is constituted by four diodes (D1–D4) and that receives the voltage output of the piezoelectric unit 210 (see FIG. 2) via the electrical wires 310. The rectifying circuit 22 processes the voltage output of the piezoelectric unit 210 to obtain a direct current voltage signal therefrom. The charging circuit 23 interconnects the rectifying circuit 22 and the rechargeable cell unit 24, and includes a voltage storing member 230, a current limiter 231 and a protective member 232. The voltage storing member 230 is in the form of a capacitor (C1) which is charged by the rectifying circuit 22. The current limiter 231 includes a limiting resistor (R1) and a diode (D5), and serves to limit the amount of current flowing from the rectifying circuit 22 to the rechargeable cell unit 24. The protective member 232 is in the form of a zener diode (D6) which is connected across the rechargeable cell unit 24 to limit the voltage across the latter so as to prevent possible damage to the signal generating device due to over voltage of the rechargeable cell unit 24.

Referring again to FIG. 3, the rechargeable cell unit 24 is connected to the processor 340 of the encoder unit 34 via the power control circuit 25 and the voltage regulating circuit 26. The power control circuit 25 is further connected to the rectifying circuit 22. When the pneumatic tire (B) (see FIG. 1) to which the pressure gauge 1 is mounted is not in motion, the self-generating voltage unit 21 ceases to generate a voltage output. The power control unit 25 does not detect a voltage output from the rectifying circuit 22, and breaks the electrical connection between the voltage regulating circuit 26 and the rechargeable cell unit 24 at this time, thereby conserving the electrical energy stored in the rechargeable cell unit 24. The voltage regulating circuit 26 regulates the operating voltage that is supplied by the rechargeable cell unit 24 to the processor 340 of the encoder unit 34 to avoid damaging the signal generating device.

Figure 5:
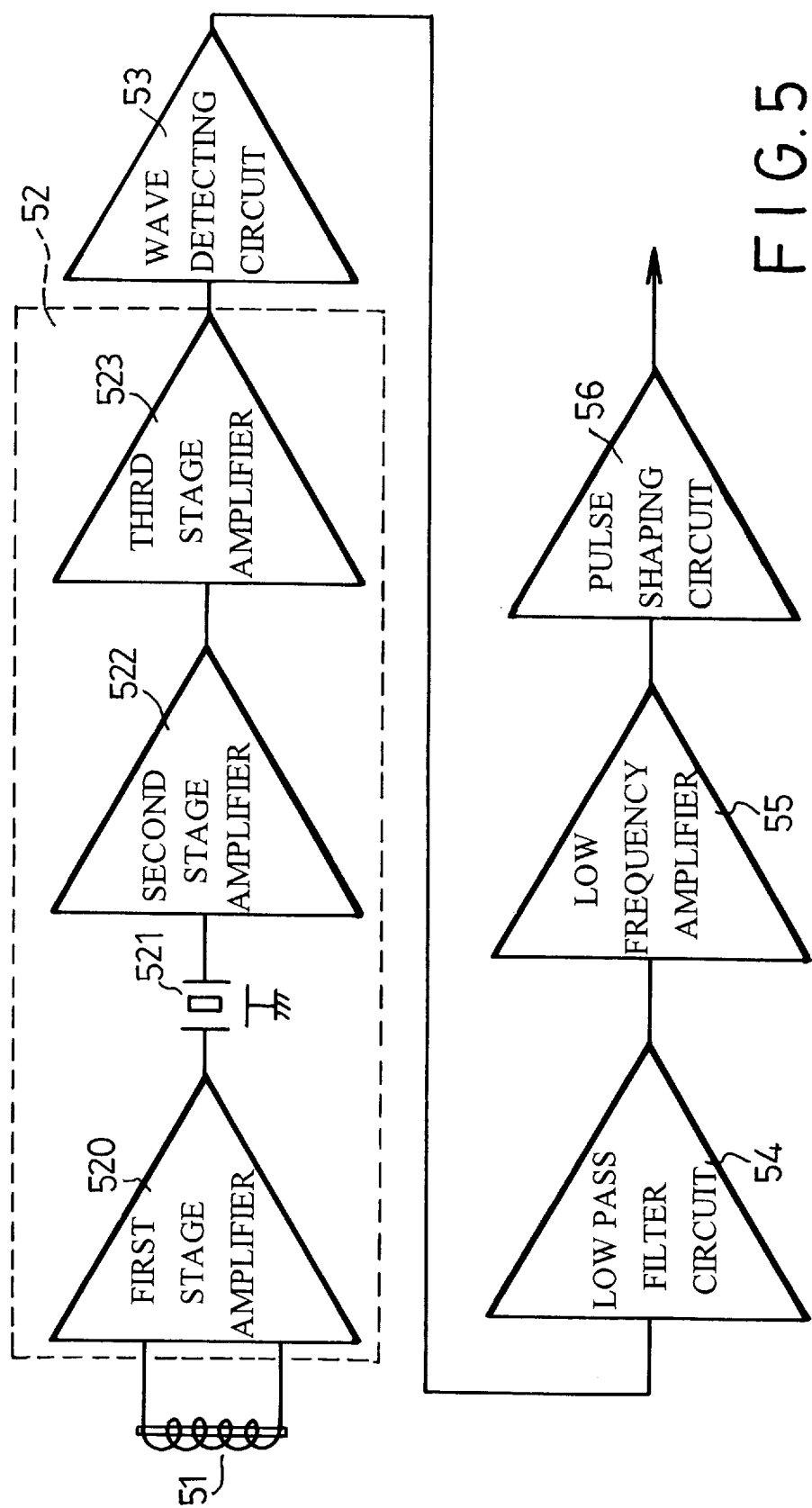
FIG. 5 is a schematic circuit block diagram of a receiver circuit of the first preferred embodiment.
Figure 6:
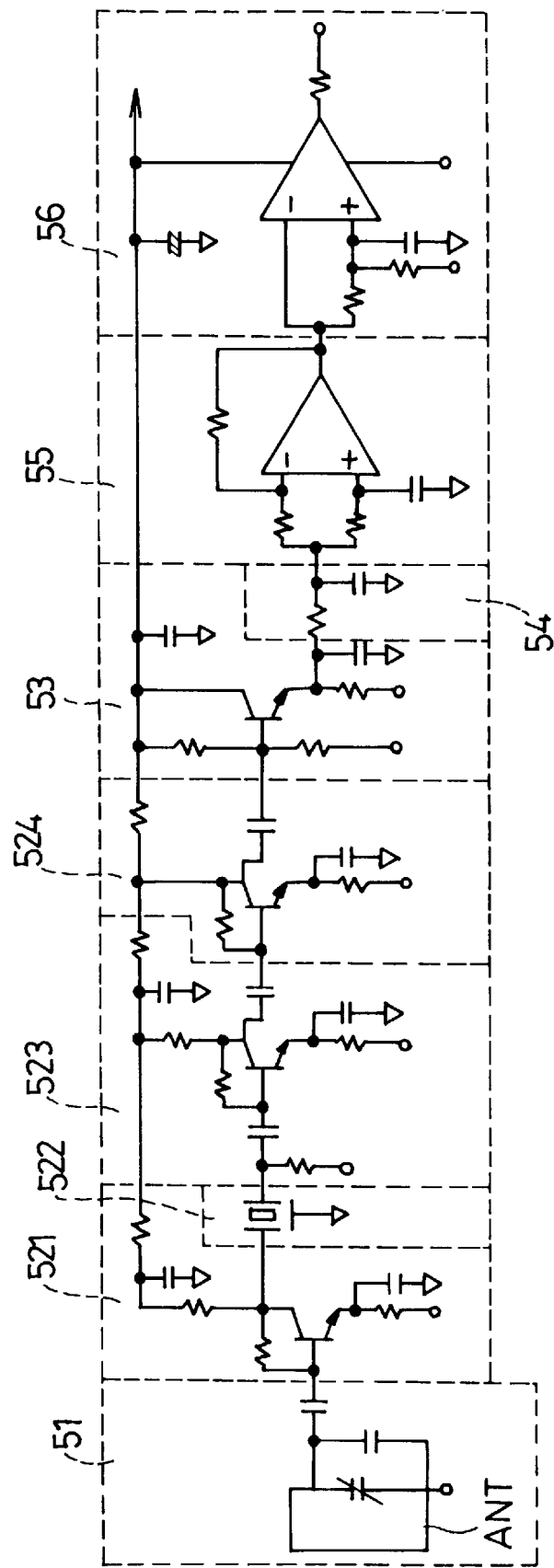
FIG. 6 is a schematic circuit diagram of the receiver circuit shown in FIG. 5.

Referring to FIGS. 1, 5 and 6, each of the receiver circuits 5 is adapted to be mounted on the vehicle (A) adjacent to a respective one of the pneumatic tires (B) so as to receive the pressure signal from the pressure gauge 1 on the adjacent one of the pneumatic tires (B) with minimal signal interference, thereby improving the accuracy of the tire pressure indicator of this invention. Each receiver circuit 5 includes a receiving antenna 51, a high frequency amplifying circuit 52, a wave detecting circuit 53, a low pass filter circuit 54, a low frequency amplifier 55 and a pulse shaping circuit 56.

The receiving antenna 51 receives the pressure signal from the pressure gauge 1 on the adjacent one of the pneumatic tires (B) and provides the same to the high frequency amplifying circuit 52. The high frequency amplifying circuit 52 includes a first stage amplifier 520 connected to the receiving antenna 51, a filter 521 connected to the first stage amplifier 520, a second stage amplifier 522 connected to the filter 521, and a third stage amplifier 523 connected to the second stage amplifier 522. The wave detecting circuit 53 is connected to the high frequency amplifying circuit 52. The low pass filter circuit 54 is connected to the wave detecting circuit 53. The low frequency amplifier 55 is connected to the low pass filter circuit 54. The pulse shaping circuit 56 is in the form of a comparator and is connected to the low frequency amplifier 55. The analog voltage output of the low frequency amplifier 55 is processed into a digital pulse signal corresponding to the pressure value in the adjacent one of the pneumatic tires (B) by the pulse shaping circuit 56.

Figure 7:
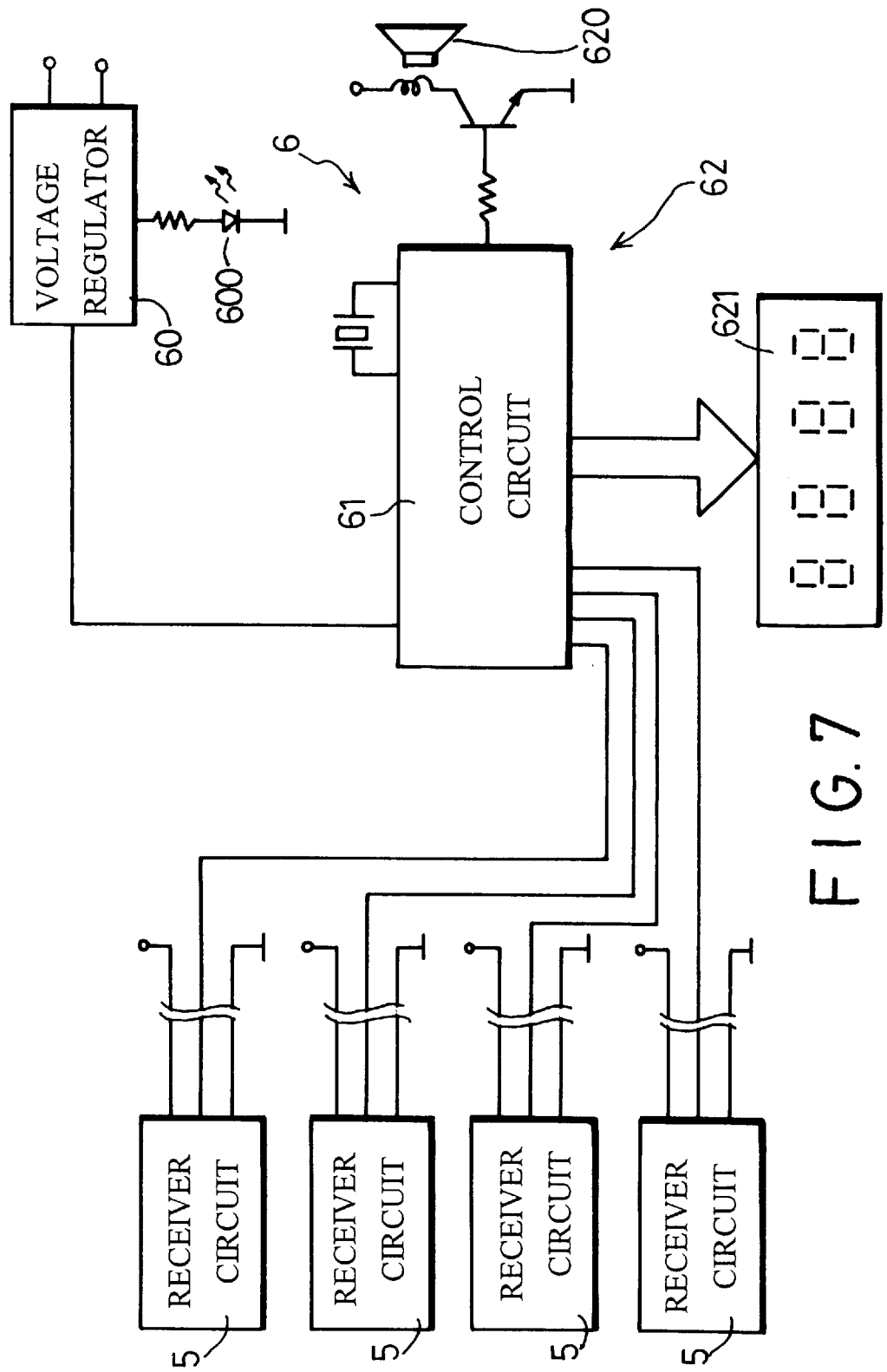
FIG. 7 is a schematic circuit block diagram illustrating a controller of the first preferred embodiment.

Referring to FIG. 7, the controller 6 of the first preferred embodiment is shown to comprise a voltage regulator 60, a control circuit 61, and an indicating unit 62.

The voltage regulator 60 is adapted to be connected to the power source (not shown) of the vehicle, and provides an operating voltage to the control circuit 61 and the indicating unit 62. A light emitting diode 600 is connected to the voltage regulator 60 and is operable so as to emit light when power is supplied to the controller 6. The control circuit 61, such as a microprocessor, is connected to the receiver circuits 5 and processes the digital pulse signals therefrom to obtain the pressure values of the air in the pneumatic tires (B) (see FIG. 1). The indicating unit 62 is connected to the control circuit 61, and includes a sound alarm unit 620 and a display unit 621. The sound alarm unit 620 is activated by the control circuit 61 when the pressure value in any of the pneumatic tires (B) is not within a normal operating pressure range. The display unit 621 can be a liquid crystal display or a light emitting diode display, and is activated by the control circuit 61 to identify an abnormal one of the pneumatic tires (B), the pressure value of which is not within the normal operating pressure range. The display unit 621 is further activated by the control circuit 61 to display the pressure value of the abnormal one of the pneumatic tires (B) thereon.

Figure 8:
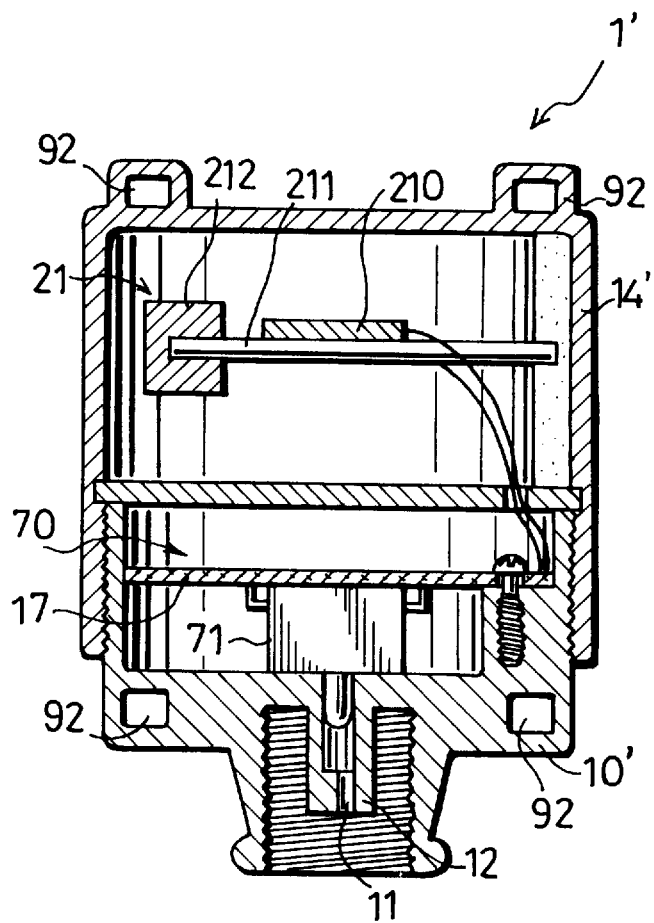
FIG. 8 is a sectional view of a pressure gauge of the second preferred embodiment of a tire pressure indicator according to the present invention.

FIG. 8 illustrates a pressure gauge 1' of the second preferred embodiment of a tire pressure indicator according to the present invention. The main difference between the pressure gauges 1, 1' resides in the construction of the signal generating device.

Figure 9:
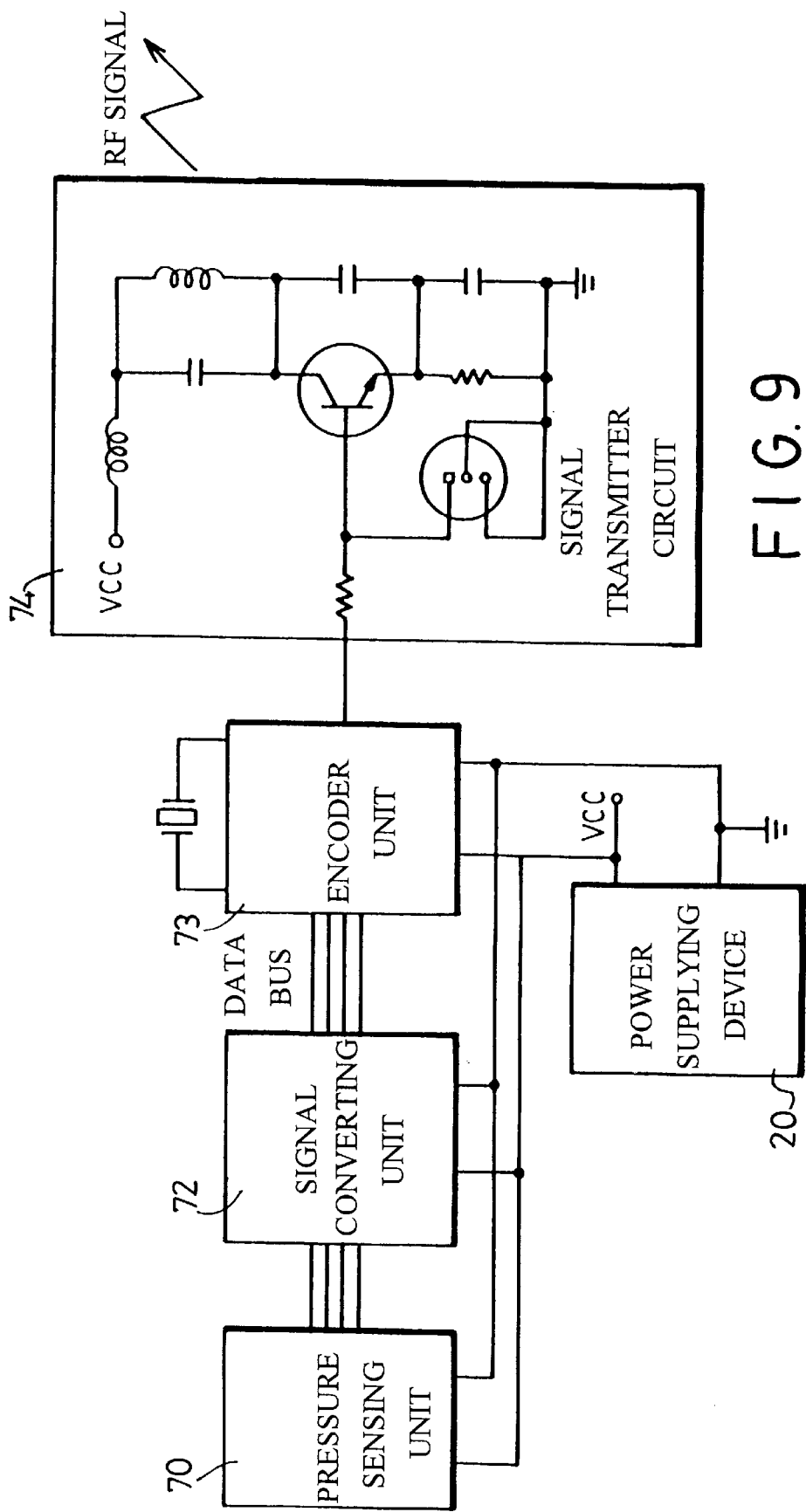
FIG. 9 is a schematic circuit block diagram of the pressure gauge shown in FIG. 8.

As shown in FIGS. 8 and 9, the signal generating device includes a pressure sensing unit 70, a signal converting unit 72, an encoder unit 73 and a signal transmitter circuit 74 mounted on the circuit board 17 that is disposed in the casing of the pressure gauge 1'.

The pressure sensing unit 70 includes a pressure sensor 71, preferably a semiconductor pressure sensor, such as the ADP1 DIP type pressure sensor manufactured by Matsushita Electric Works under the brand name NAIS. The pressure sensor 71 is mounted on a bottom side of the circuit board 17 and extends into the finger piece 12 so as to be in fluid communication with the aperture 11. The pressure sensor 71 generates an analog voltage signal which varies in accordance with the pressure of the air that enters into the finger piece 12 via the aperture 11.

The signal converting unit 72 is connected electrically to the pressure sensing unit 70 and serves to convert the analog voltage signal of the latter into a digital output signal. The encoder unit 73 is connected electrically to the signal converting unit 72 and receives the digital output signal of the latter. The encoder unit 73 compares the digital output signal of the signal converting unit 72 with low pressure and high pressure limits of a predetermined normal operating pressure range. The encoder unit 73 generates a pressure signal which includes the digital output signal and an identification code unique to the pressure gauge 1' when the digital output signal is not within the normal operating pressure range. Preferably, no pressure signal is generated when the digital output signal is between the low pressure and high pressure limits, indicating that the pressure of the air that enters into the finger piece 12 via the aperture 11 is within the normal operating pressure range. The signal transmitter circuit 74 is connected electrically to the encoder unit 73 and receives the pressure signal therefrom. The signal transmitter circuit 74 transmits the pressure signal wirelessly in the form of a radio frequency (RF) signal.

Like the previous embodiment, a power supplying device 20 supplies the electric power required to operate the signal generating device. Since the power supplying device 20 is identical to that of the previous embodiment, a detailed description of the same will be omitted herein.

In the first preferred embodiment, receiver circuits 5 are mounted on the vehicle (A) adjacent to the pneumatic tires (B) so as to receive the pressure signals from the pressure gauges 1, respectively. A controller 6 is connected to the receiver circuits 5 and processes the pressure signals received thereby to determine which one of the pneumatic tires (B) has a pressure value that is not within the normal pressure operating range.

Figure 10:
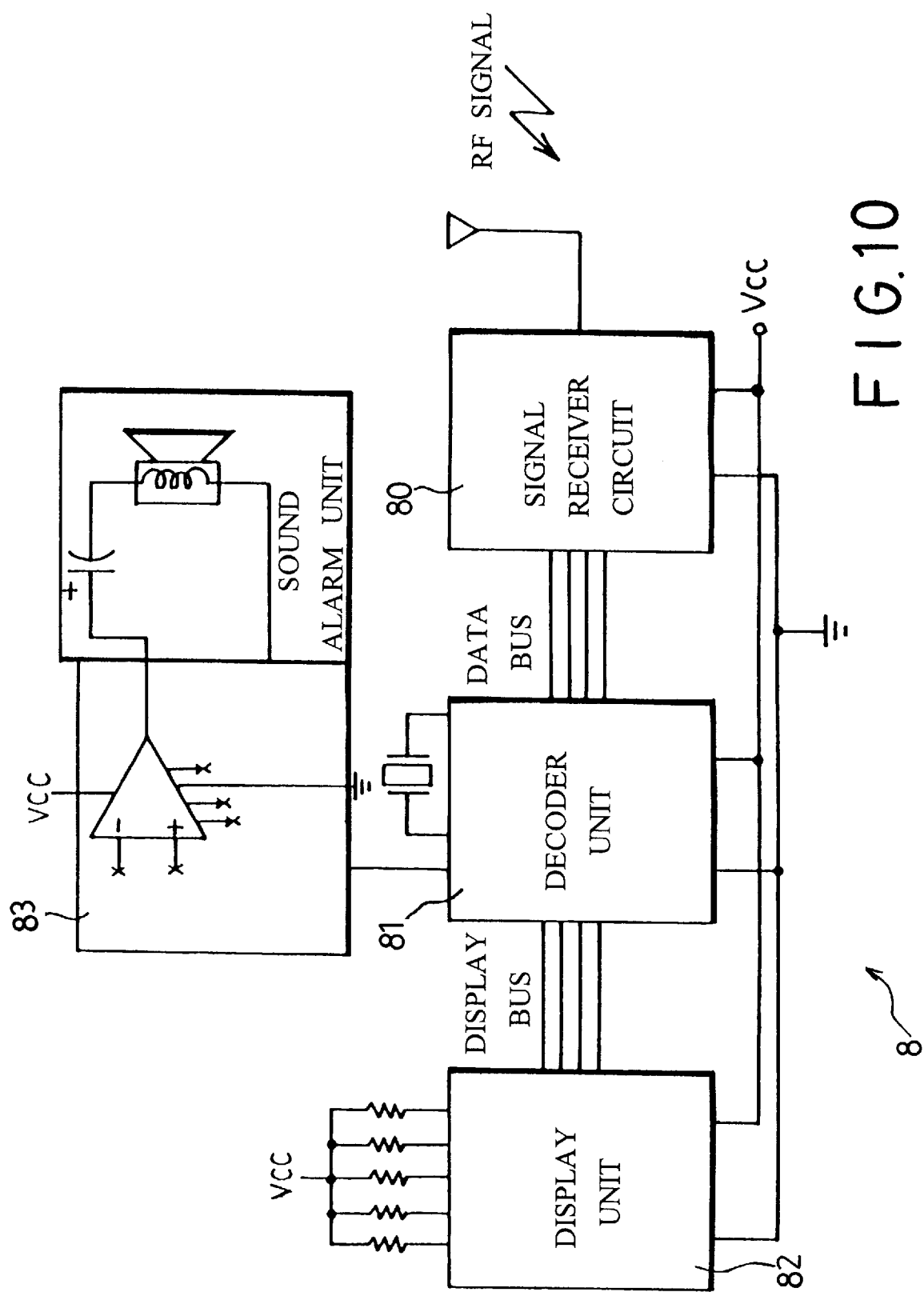
FIG. 10 is a schematic circuit block diagram of a receiver device of the second preferred embodiment.

In the second preferred embodiment, a receiver device 8 (see FIG. 10) of the tire pressure indicator is built as a part of the instrument panel of a vehicle or as a separate device to be installed in the driver room of the vehicle, and provides information to the driver concerning the pressure condition of the pneumatic tires on which the pressure gauges 1' are mounted. As shown in FIG. 10, the receiver device 8 includes a signal receiver circuit 80, a decoder unit 81 connected electrically to the signal receiver circuit 80, a display unit 82 connected electrically to the decoder unit 81, and a sound alarm unit 83 connected electrically to the decoder unit 81.

The signal receiver circuit 80 receives and demodulates the RF signals transmitted by the pressure gauges 1', and provides the same to the decoder unit 81. The display unit 82 is controlled by the decoder unit 81 so as to identify an abnormal one of the pneumatic tires, the pressure value of which is not within the normal operating pressure range. The display unit 82 is further controlled by the decoder unit 81 to display the pressure value of the abnormal one of the pneumatic tires thereon. The sound alarm unit 83 is controlled by the decoder unit 81 so as to generate an audible alarm output for informing the driver of the vehicle when one of the pneumatic tires is under- or over-inflated. Preferably, the electric power required by the receiver device 8 is supplied by a dc battery (not shown) of the vehicle.

Figure 11:
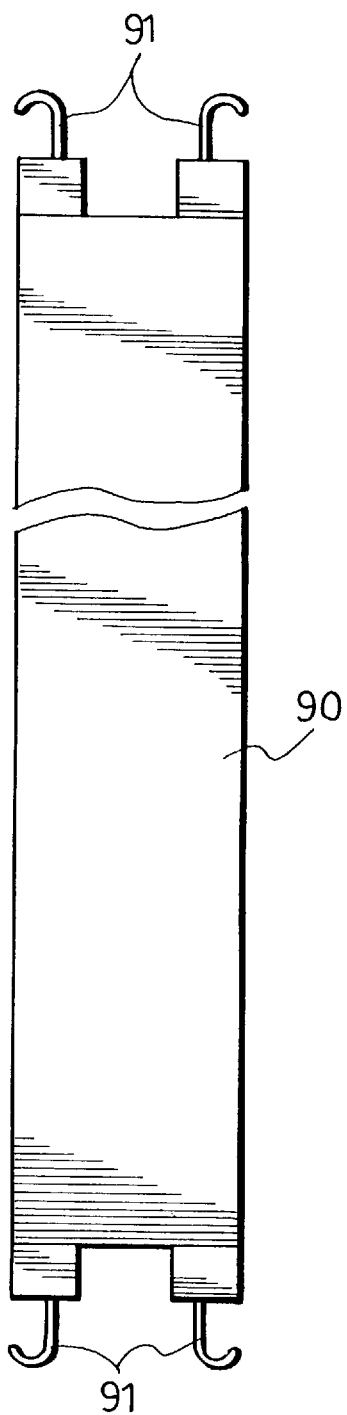
FIG. 11 illustrates an elastic strap used to secure the pressure gauge of FIG. 8 to a metal wheel of a pneumatic tire.
Figure 12:
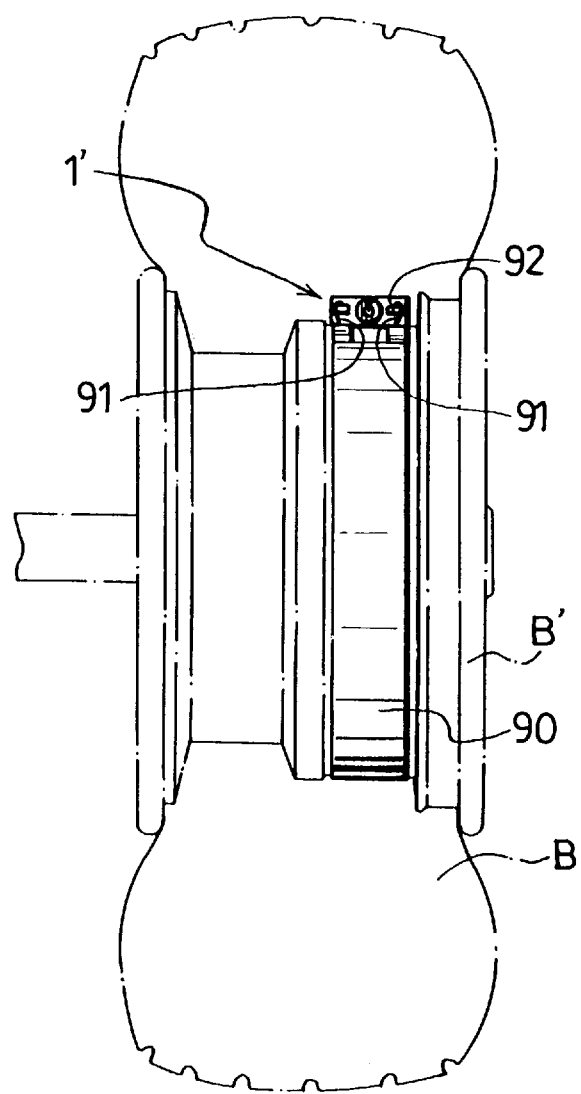
FIG. 12 is a schematic view illustrating the pressure gauge of FIG. 8 when secured to the metal wheel of a pneumatic tire.

Referring once again to FIG. 8, each of the first end of the adaptor 10' and the closed end of the cap 14' of the casing of the pressure gauge 1' is formed with a pair of retaining holes 92. Referring to FIGS. 11 and 12, instead of mounting the pressure gauge 1' on the inflating valve of the pneumatic tire (B), the pressure gauge 1' can be secured to the metal wheel (B') of the pneumatic tire (B) by means of an elastic strap 90 which extends around the metal wheel (B'), thereby concealing the pressure gauge 1' in the pneumatic tire (B). The elastic strap 90 has opposite ends formed with a pair of hook units 91 which engage the retaining holes 92 in the casing of the pressure gauge 1' for securing the latter on the metal wheel (B').

Figure 13:
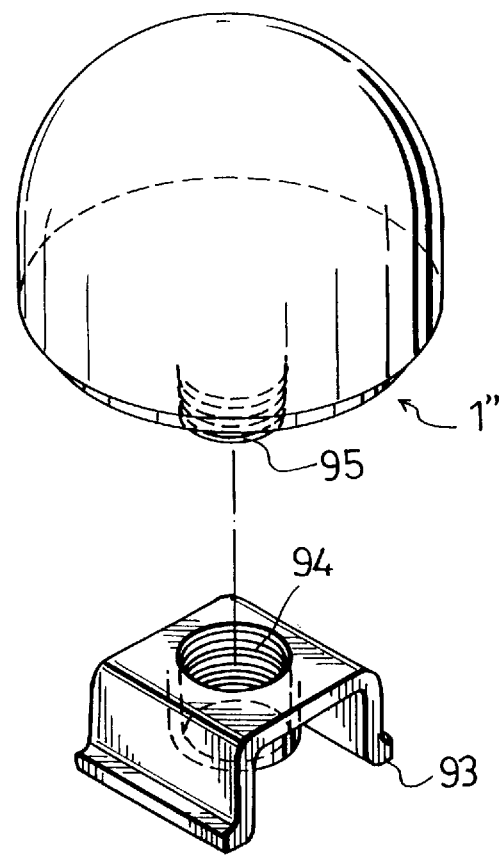
FIG. 13 is a partly exploded view illustrating a casing and a coupling seat of a pressure gauge of the third preferred embodiment of a tire pressure indicator according to the present invention.
Figure 14:
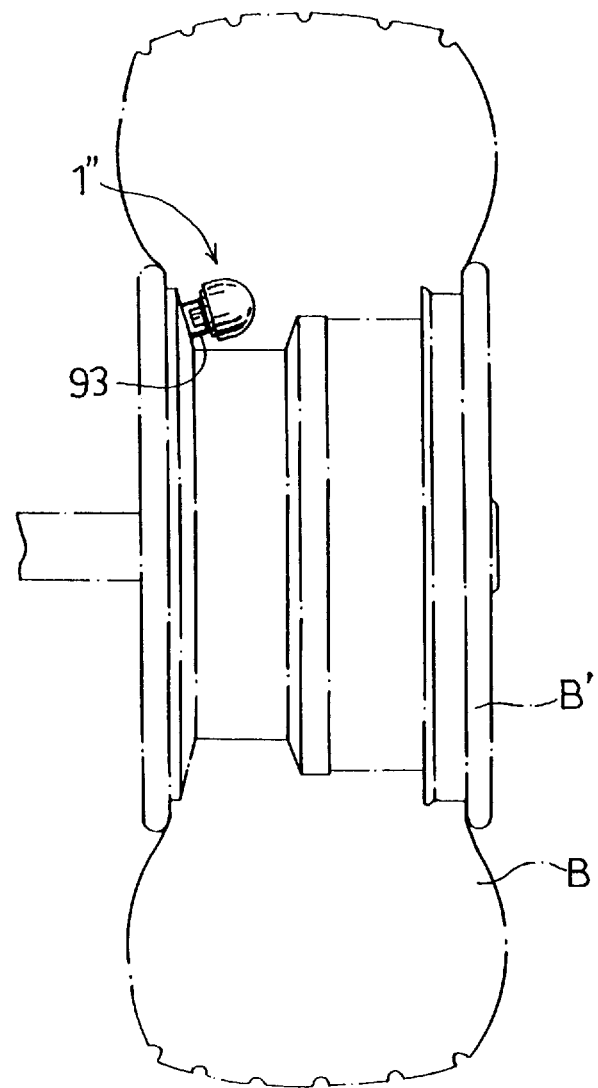
FIG. 14 is a schematic view illustrating how the coupling seat secures the casing of FIG. 13 to a metal wheel of a pneumatic tire.

The methods of mounting the pressure gauge on the pneumatic tire should not be limited to those used in the preceding embodiments. As shown in FIGS. 13 and 14, the casing of the pressure gauge 1" of the third preferred embodiment of a tire pressure indicator according to the present invention is modified by providing the same with an externally threaded coupling tube 95. A coupling seat 93 is formed with an internally threaded hole 94 for engaging the coupling tube 95, and is welded onto the metal wheel (B') of a pneumatic tire (B) such that the bottom ends of the coupling tube 95 and the coupling seat 93 form a clearance with the metal wheel (B') to permit entry of air in the pneumatic tire (B) into the casing of the pressure gauge 1" via the coupling tube 95.

Since the pressure gauges of the tire pressure indicator of this invention are capable of generating power when the pneumatic tires are in motion, the possibility that the pressure gauges will run out of power can be eliminated to ensure proper operation of the pressure gauges without causing any inconvenience to the owner of the vehicle. The object of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A tire pressure indicator for a set of pneumatic tires of a vehicle, said tire pressure indicator comprising a plurality of pressure gauges, each of which includes:

a casing formed with an aperture and adapted to be mounted on a respective one of the pneumatic tires such that air in the respective one of the pneumatic tires flows into said casing via said aperture;

a signal generating device disposed in said casing and capable of transmitting wirelessly a pressure signal corresponding to pressure of the air in the respective one of the pneumatic tires; and a power supplying device disposed in said casing and connected electrically to said signal generating device so as to supply electric power for operating said signal generating device, said power supplying device including a self-generating voltage unit which has a spring plate with a mounting end secured to said casing and an opposite distal end, a weighting block secured to said distal end, and a piezoelectric unit secured to said spring plate, said spring plate being capable of deforming so as to subject said piezoelectric unit to mechanical stress when the pneumatic tire to which said casing is mounted is in motion so as to enable said piezoelectric unit to generate a voltage output.

2. The tire pressure indicator as claimed in claim 1, wherein said power supplying device further includes a rechargeable cell unit, and a rectifying circuit and a charging circuit which interconnect said self-generating voltage unit and said rechargeable cell unit to permit charging of said rechargeable cell unit using the voltage output from said piezoelectric unit.

3. The tire pressure indicator as claimed in claim 2, wherein said rectifying circuit converts the voltage output of said piezoelectric unit into a direct current voltage signal, said charging circuit interconnecting said rectifying circuit and said rechargeable cell unit, said charging circuit including a voltage storing member which is charged by said rectifying circuit, a current limiter for limiting amount of current flowing from said rectifying circuit to said rechargeable cell unit, and a protective member which is connected across said rechargeable cell unit to limit voltage across said rechargeable cell unit.

4. The tire pressure indicator as claimed in claim 2, wherein said power supplying device further includes a power control circuit that interconnects said signal generating device and said rechargeable cell unit, said power control circuit being further connected to said rectifying circuit and breaking electrical connection between said signal generating device and said rechargeable cell unit when said rectifying circuit ceases to provide the direct current voltage signal due to stopping of the pneumatic tire to which said casing is mounted.

5. The tire pressure indicator as claimed in claim 4, wherein said power supplying device further includes a voltage regulating circuit which interconnects said power control circuit and said signal generating device to regulate an operating voltage that is supplied by said rechargeable cell unit to said signal generating device.

6. The tire pressure indicator as claimed in claim 1, wherein said signal generating device comprises:
  a pressure sensing unit including: a sensing coil mounted in said casing; a volume variable member disposed in said casing and having an open end in fluid communication with said aperture, and an opposite closed end, said volume variable member expanding in said casing according to the pressure of the air in the pneumatic tire to which said casing is mounted; a magnetic core formed as a shaft which has a lower portion that is mounted on said closed end of said volume variable member, and an upper portion that extends into said sensing coil such that depth of extension of said upper portion of said magnetic core into said sensing coil varies according to expansion of said volume variable member in said casing; and an encoder unit connected to said sensing coil, said encoder unit detecting the depth of extension of said upper portion of said magnetic core into said sensing coil and determining a pressure value in the pneumatic tire to which said casing is mounted therefrom; and
  a signal transmitter circuit connected to said encoder unit and controlled by said encoder unit to transmit the pressure signal corresponding to the pressure value wirelessly.

7. The tire pressure indicator as claimed in claim 6, wherein said encoder unit includes:
  an oscillator connected to said sensing coil and having an oscillating frequency output that varies according to the depth of extension of said upper portion of said magnetic core into said sensing coil; and
  a processor connected to said oscillator and said signal transmitter circuit, said processor detecting the oscillating frequency output of said oscillator and converting the oscillating frequency output into the pressure value in the pneumatic tire to which said casing is mounted, said processor controlling said signal transmitter circuit to transmit the pressure signal corresponding to the pressure value wirelessly.

8. The tire pressure indicator as claimed in claim 1, further comprising a plurality of receiver circuits, each of which is adapted to be mounted on the vehicle adjacent to a respective one of the pneumatic tires, each of said receiver circuits receiving the pressure signal that is transmitted wirelessly by said pressure gauge on the adjacent one of the pneumatic tires.

9. The tire pressure indicator as claimed in claim 8, further comprising a control circuit that is connected to said receiver circuits and that processes signals received from said receiver circuits to obtain pressure values of the air in the pneumatic tires.

10. The tire pressure indicator as claimed in claim 9, further comprising a sound alarm unit connected to said control circuit and activated by said control circuit when the pressure value in any of the pneumatic tires is not within a normal operating pressure range.

11. The tire pressure indicator as claimed in claim 9, further comprising a display unit connected to said control circuit and activated by said control circuit to identify an abnormal one of the pneumatic tires, the pressure value of which is not within a normal operating pressure range, said display unit being further activated by said control circuit to display the pressure value of the abnormal one of the pneumatic tires thereon.

12. The tire pressure indicator as claimed in claim 1, wherein said signal generating device comprises:
  a pressure sensing unit which generates an analog voltage signal that varies in accordance with the pressure of the air that flows into said casing via said aperture;
  a signal converting unit connected to said pressure sensing unit for converting the analog voltage signal into a digital output signal;
  an encoder unit connected to said signal converting unit, said encoder unit comparing the digital output signal of said signal converting unit with high pressure and low pressure limits of a normal operating pressure range, said encoder unit generating the pressure signal which corresponds to the digital output signal when the digital output signal is not within the normal operating pressure range; and
  a signal transmitter circuit connected to said encoder unit for transmitting the pressure signal from said encoder unit wirelessly.

13. The tire pressure indicator as claimed in claim 12, wherein said pressure sensing unit of said signal generating device includes a semiconductor pressure sensor that is in fluid communication with said aperture.

14. The tire pressure indicator as claimed in claim 12, wherein the pressure signal generated by said encoder unit further includes an identification code unique to said pressure gauge.

15. The tire pressure indicator as claimed in claim 14, further comprising a receiver device which includes a signal receiver circuit for receiving the pressure signal transmitted by said pressure gauges, and a decoder unit connected to said signal receiver circuit so as to receive the pressure signal therefrom.

16. The tire pressure indicator as claimed in claim 15, wherein said receiver device further includes a display unit connected to said decoder unit and controlled by said decoder unit to identify an abnormal one of the pneumatic tires, the pressure value of which is not within the normal operating pressure range, said display unit being further activated by said control circuit to display the pressure value of the abnormal one of the pneumatic tires thereon.

17. The tire pressure indicator as claimed in claim 15, wherein said receiver device further includes a sound alarm unit connected to said decoder unit and controlled by said decoder unit so as to generate an audible alarm output when the pressure value in any of the pneumatic tires is not within the normal operating pressure range.

18. A pressure gauge for a pneumatic tire of a vehicle, comprising:
  a casing formed with an aperture and adapted to be mounted on the pneumatic tire such that air in the pneumatic tire flows into said casing via said aperture;
  a signal generating device disposed in said casing and capable of transmitting wirelessly a pressure signal corresponding to pressure of the air in the pneumatic tire; and
  a power supplying device disposed in said casing and connected electrically to said signal generating device so as to supply electric power for operating said signal generating device, said power supplying device including a self-generating voltage unit which has a spring plate with a mounting end secured to said casing and an opposite distal end, a weighting block secured to said distal end, and a piezoelectric unit secured to said spring plate, said spring plate being capable of deforming so as to subject said piezoelectric unit to mechanical stress when the pneumatic tire is in motion so as to enable said piezoelectric unit to generate a voltage output.

19. The pressure gauge as claimed in claim 18, wherein said power supplying device further includes a rechargeable cell unit, and a rectifying circuit and a charging circuit which interconnect said self generating voltage unit and said rechargeable cell unit to permit charging of said rechargeable cell unit using the voltage output from said piezoelectric unit.

20. The pressure gauge as claimed in claim 19, wherein said rectifying circuit converts the voltage output of said piezoelectric unit into a direct current voltage signal, said charging circuit interconnecting said rectifying circuit and said rechargeable cell unit, said charging circuit including a voltage storing member which is charged by said rectifying circuit, a current limiter for limiting amount of current flowing from said rectifying circuit to said rechargeable cell unit, and a protective member which is connected across said rechargeable cell unit to limit voltage across said rechargeable cell unit.

21. The pressure gauge as claimed in claim 19, wherein said power supplying device further includes a power control circuit that interconnects said signal generating device and said rechargeable cell unit, said power control circuit being further connected to said rectifying circuit and breaking electrical connection between said signal generating device and said rechargeable cell unit when said rectifying circuit ceases to provide the direct current voltage signal due to stopping of the pneumatic tire.

22. The pressure gauge as claimed in claim 21, wherein said power supplying device further includes a voltage regulating circuit which interconnects said power control circuit and said signal generating device to regulate an operating voltage that is supplied by said rechargeable cell unit to said signal generating device.

23. The pressure gauge as claimed in claim 18, wherein said signal generating device comprises:

a pressure sensing unit including: a sensing coil mounted in said casing; a volume variable member disposed in said casing and having an open end in fluid communication with said aperture, and an opposite closed end, said volume variable member expanding in said casing according to the pressure of the air in the pneumatic tire; a magnetic core formed as a shaft which has a lower portion that is mounted on said closed end of said volume variable member, and an upper portion that extends into said sensing coil such that depth of extension of said upper portion of said magnetic core into said sensing coil varies according to expansion of said volume variable member in said casing; and an encoder unit connected to said sensing coil, said encoder unit detecting the depth of extension of said upper portion of said magnetic core into said sensing coil and determining a pressure value in the pneumatic tire therefrom; and a signal transmitter circuit connected to said encoder unit and controlled by said encoder unit to transmit the pressure signal corresponding to the pressure value wirelessly.

24. The pressure gauge as claimed in claim 23, wherein said encoder unit includes:

an oscillator connected to said sensing coil and having an oscillating frequency output that varies according to the depth of extension of said upper portion of said magnetic core into said sensing coil; and a processor connected to said oscillator and said signal transmitter circuit, said processor detecting the oscillating frequency output of said oscillator and converting the oscillating frequency output into the pressure value in the pneumatic tire, said processor controlling said signal transmitter circuit to transmit the pressure signal corresponding to the pressure value wirelessly.

25. The pressure gauge as claimed in claim 18, wherein said signal generating device comprises:

a pressure sensing unit which generates an analog voltage signal that varies in accordance with the pressure of the air that flows into said casing via said aperture;

a signal converting unit connected to said pressure sensing unit for converting the analog voltage signal into a digital output signal;

an encoder unit connected to said signal converting unit, said encoder unit comparing the digital output signal of said signal converting unit with high pressure and low pressure limits of a normal operating pressure range, said encoder unit generating the pressure signal which corresponds to the digital output signal when the digital output signal is not within the normal operating pressure range; and a signal transmitter circuit connected to said encoder unit for transmitting the pressure signal from said encoder unit wirelessly.

26. The pressure gauge as claimed in claim 25, wherein said pressure sensing unit of said signal generating device includes a semiconductor pressure sensor that is in fluid communication with said aperture.

27. The pressure gauge as claimed in claim 25, wherein the pressure signal generated by said encoder unit further includes an identification code unique to said pressure gauge.

* * * * *